United States Patent Office 2,766,273
Patented Oct. 9, 1956

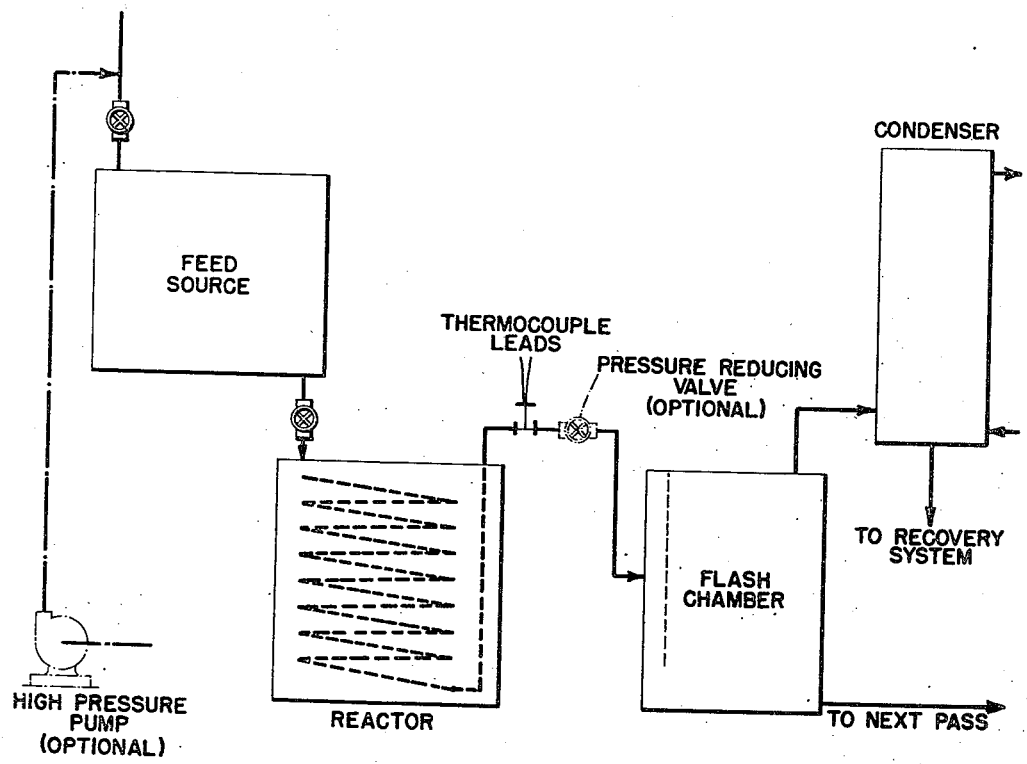

2,766,273

ESTERIFICATION OF ACIDS

Paul F. Bruins, Douglaston, and Robert C. Canapary, Brooklyn, N. Y., assignors to Chas. Pfizer & Co., Inc., Brooklyn, N. Y., a corporation of New Jersey Application May 4, 1951, Serial No. 224,514

7 Claims. (Cl. 260—484)

This invention is concerned with the production of esters, and in particular with those that are difficult to prepare.

Carboxylic acids may be esterified with alcohols by merely mixing the reactants and allowing the mixture to stand, but the equilibrium concentration of the product and the rate at which that equilibrium is attained are often such that this method is wholly impractical. In order to accelerate the reaction, i. e. the attainment of equilibrium conditions, an acid catalyst like sulfuric acid or hydrochloric acid is often added. As a further accelerant, heat may be applied to the reaction mixture. However, if either the carboxylic acid or the alcohol or both are sensitive to such conditions, decomposition is encountered which renders the product difficult to purify and frequently useless. Other means have been employed to effect esterification. For instance, the acid chloride of the carboxylic acid is first prepared, or its anhydride, either of which will react more quickly and completely with the alcohol than will the free carboxylic acid. However, this requires an additional step and the use of reagents which may be corrosive and difficult to handle.

The process of the present invention permits the convenient and rapid attainment of equilibrium conditions during esterification. It allows one readily to obtain, for instance, pure esters of polycarboxylic acids, even when such acids are unusually sensitive to prolonged heating and the presence of acid catalysts. This is a particularly important advance in the art, because the esters formed from such polybasic acids have been heretofore difficult to purify by industrially practical methods. When, for instance, citric acid is esterified with butanol or similar alcohol, using a strong acid like sulfuric for the catalyst, the prolonged heating required to complete the reaction causes appreciable decomposition and darkening of the product. This, of course, greatly lessens the quality of the ester isolated and its value for many uses in commerce. Additional steps must be taken to prepare a suitable product. By avoidance of this problem, great saving is now achieved.

Not only may polycarboxylic acids be esterified with monohydric alcohols but, by this new process, long chain monocarboxylic (e. g. fatty) acids of low volatility may be most readily esterified with polyhydric alcohols, such as glycols. The reaction of high-boiling fatty acids with volatile lower monohydric alcohols presents similar difficulties which are also overcome by this invention.

According to the present process, a carboxylic acid is esterified with an alcohol under superatmospheric pressure and at an elevated temperature substantially between 100° and 300° C. When a lower monohydric alcohol is used, the temperature should be above the normal boiling point of that alcohol and the pressure should be high enough to minimize its vaporization, which would otherwise occur at such temperature, so that the reactants are kept in the liquid state in the reaction zone. By carrying out esterification in this manner, equilibrium conditions with regard to the concentration of the carboxylic acid, alcohol, ester, and water are very rapidly attained, and yet decomposition of the product and the reactants is kept at a minimum. This new method is suited to the reaction of a polycarboxylic acid with a monohydric alcohol or the reaction of a monocarboxylic acid with a mono- or polyhydric alcohol, i. e. at least one of the two raw materials must be mono-functional. If both reactants are poly-functional, proper esterification is not effected, but resinous polymeric products result. As aforesaid, the process is especially suitable for polycarboxylic acids that are difficult to esterify and that tend to decompose on prolonged heating in the presence of acid catalysts. With ordinary esterification procedures there is a definite tendency, for instance, for citric acid to be dehydrated to aconitic acid and for aconitic acid to undergo further decomposition. In the new process decomposition of citric acid, when subjected to esterification at temperatures of say 200° C., is below a measurable level. Products of improved color and utility are thus obtained.

Among the carboxylic acids with which this process is especially useful are those of the aliphatic series, such as citric acid, aconitic acid, itaconic acid, tartaric acid, fumaric acid and so forth. Particularly successful esterification is realized with di- and tricarboxylic aliphatic acids. The second or third carboxylic acid group is usually more slowly reacted with alcohol than the first; for instance the two terminal COOH groups of citric and aconitic acids are esterified with some degree of ease, but the same group at the center of the molecule generally reacts much less readily. The new process may also be applied to other types of polybasic acids, including aromatic compounds like phthalic acid and its isomers.

A number of alcohols may be used in this novel process, especially the methyl, ethyl, isopropyl, butyl, hexyl, octyl, and like monohydric aliphatic compounds. The alcohols may be straight or branched chain, primary or secondary in nature. The esters of polycarboxylic acid with butyl and higher alcohols containing up to about eight carbon atoms are particularly valuable as plasticizers.

As pointed out above, the process of this invention is also useful for the esterification of the higher boiling monocarboxylic acids, such as the fatty acids, with either volatile monohydric alcohols, such as methanol, ethanol, and so forth, or with polyhydric alcohols, such as ethylene glycol, glycerin, and so forth. By the use of the new process of this invention, the reaction may be greatly accelerated and products of lighter color containing lesser amounts of decomposition products may be obtained. Crude mixtures of long chain, aliphatic, monocarboxylic acids, such as tall oil, may be used. Other mixtures of the long chain carboxylic acids derived from natural oils or fats are also quite useful.

As is generally true in esterifying operations, it is preferable to employ a catalyst like a mineral acid or strong organic acid to implement the reaction. Sulfuric acid, phosphoric acid, hydrochloric acid, and organic acids like alkanesulfonic and arylsulfonic acids are commonly used, but other materials of an acidic nature also are valuable, e. g. phosphorus halides and thionyl chloride. It is obvious that the rate at which equilibrium conditions will be reached at any given temperature will vary somewhat with the type of catalyst used and its proportion. In general less than about 8% of the catalyst, based on the weight of carboxylic acid, is sufficient, while from about 0.5% to about 5% is usually enough. Alternatively, one may use a strongly acidic, stable resin, such as a polystyrenesulfonic acid. Other operable catalysts will be apparent to those skilled in the art. Of course, materials of construction in the reactor and auxiliary equipment must resist attack by the catalyst at the temperatures and pressures involved.

In operating this process, it is best to use temperatures in the range of from about 100° C. to about 300° C., depending upon the boiling point of the chosen reactants. The best temperature for a given acid and alcohol may readily be determined by one skilled in the art. In general, the higher the molecular weight of the alcohol reactant, the more slowly is equilibrium reached when operating conditions remain constant. Thus, if butanol and citric acid are reacted, with sulfuric acid as the catalyst, this combination takes a shorter time to reach equilibrium at a given elevated temperature than does a similar mixture containing hexanol in place of the butanol. The long-chain monocarboxylic acids are esterified more slowly than the lower acids, and the polyhydric alcohols are generally esterified more slowly than are the monohydric alcohols. The reaction rate may be increased by raising the temperature at which the reaction is conducted. The pressure may also be readjusted. The rapidity of reaching equilibrium will also depend upon the proportion of reactants and the effectiveness of the catalyst. It is preferable to use at least about 2, and generally not more than about 5, moles of the alcohol per mole of COOH group in the carboxylic acid. If the proportion is less than about 2:1, considerable difficulty may be encountered in dissolving the polycarboxylic acid, since most of these are solids, while a ratio of greater than 5:1 is generally not economically advisable. Thus, when butanol and citric acid are the reactants and are used in proportions of from about 2 to about 5 moles of alcohol per mole of carboxylic acid group, equilibrium is attained with pressures of substantially from 100 to 250 p. s. i. and temperatures in the range of 140° to 200° C. in a matter of between 1 and 5 minutes and usually in less than two or three minutes. Conditions that are best suited for the type and concentration of alcohol, carboxylic acid and catalyst, and for the particular design of apparatus, may readily be determined by a chemist familiar with such processes, and it is obvious that these various factors are interdependent.

Water formed in the esterification should be removed to implement completion of the reaction. This is readily done by allowing the hot reaction mixture to pass from the reaction zone at elevated pressure into a zone at atmospheric pressure, whereby a considerable proportion of the water and unreacted monohydric alcohol will be flashed off. The polyhydric alcohols are, of course, of lower volatility. This vaporized mixture may be condensed and the alcohol therein recovered for reuse. The non-volatile residue containing ester, some unreacted carboxylic acid, a minor proportion of water and alcohol, may be treated to recover the ester by any desired means. For optimum yields it is preferable to subject the residue to further esterification, especially by a second treatment according to the process of this invention. Thus, some fresh alcohol may be added and the mixture repassed through a similar piece of apparatus under superatmospheric pressure at a temperature above the normal boiling point of the monohydric alcohol constituent, to bring the esterification more nearly to completion. If desired, such treatment may be repeated several times until the free carboxylic acid is reduced to a minimum.

In operating this new process, one arrangement of apparatus is especially preferred. This is illustrated in the accompanying drawing. As there shown, the reaction mixture is introduced to the reactor from a feed source. This may be simply a vessel in which the alcohol and carboxylic acid are mixed. Such vessel can consist of an open tank operated at ordinary pressure and equipped with an agitator so that a uniform mixture of the reactants may be prepared. The catalyst may be added in this vessel or may be introduced to the mixture via a separate line prior to charging the reactor. If the reactants and the catalyst are liquids and are completely miscible, the volume of the mixer may be reduced to a minimum. Metering devices may be attached to the vessel to introduce only the desired proportions of reactants and catalyst, the entire mass being then carried to the reaction zone by suitable conduit means. Alternatively, and especially for continuous operation, it may be more desirable to mix large quantities of the reactants and simply feed a portion of the mixture continuously to the reactor. This method is preferred particularly when the chosen acid is a solid polycarboxylic acid, for example citric acid or aconitic acid. Since solubility in organic alcohols, particularly the higher alcohols, may be limited, it is best to mix alcohol, carboxylic acid, and catalyst for at least a short time before introduction to the reactor. Esterification starts during mixing and the solubility of the solid acid will be increased sufficiently so that a homogeneous liquid mixture is obtained. If desired, slight preheating of the mixture may also be used. No decomposition will ensue even though the mixture may be kept several hours while part of it is being fed through the reactor.

The mixing vessel for the reactants may be so arranged that superatmospheric pressure may be applied to it and the contents forced through a valved conduit directly to the reaction zone. Alternatively, a suitable pump may be used to force the mixture into the reactor at the desired pressure. (This is indicated in the figure as optional.) If the pressure is maintained by means of a compressed gas, an inert gas such as nitrogen may be employed. As previously mentioned, pressures of at least about one hundred pounds per square inch are desirable, and a pressure of two hundred and fifty pounds per square inch is particularly useful when running esterifications with butanol or hexanol at temperatures ranging from about 150° to 200° C.

The most important piece of equipment in this preferred type of apparatus is the actual reactor in which the high temperature and pressure esterification occurs. This is tubular- or pipe-shaped and generally takes the form of a coil, with relatively heavy walls and small bore, made of material such as metal which will withstand the conditions of the reaction. A filter may be inserted at the mouth of this tube, so that no solid material may enter and plug it. Other precautions generally taken in operating at superatmospheric pressures and elevated temperatures will be apparent to the skilled engineer and are applicable here. Valve means for regulating pressure and heating elements for controlling temperature within the coil may be provided. Monel metal tubing is quite suitable for such a reactor, but other metal alloys and stainless steels of proper type may be substituted. In one coil used to carry out this process, Monel metal tubing was used having an outside diameter of 0.125 inch, an inside diameter of .055 inch and a length of 180 feet. In a tube of this length and small bore, there is considerable pressure drop, depending to some extent upon the particular arrangement of tubing, the nature of the reaction mixture and so forth. One advantageous feature encountered with this type of reactor is that a high Reynold's number is obtained, that is, the liquid in passing through the tube is subjected to highly turbulent flow; this is very desirable, since it assures that the reaction mixture will be thoroughly mixed and will reach equilibrium for the specific conditions used in a minimum time.

Near the end of the reactor opposite to that in which the esterification mixture is introduced, outlet means are provided. An automatic pressure reducing valve, which will serve to reduce the pressure of the mixture to that of the atmosphere, may be inserted here. This should be of suitable material and design, so that a constant determined pressure (atmospheric or greater) may be maintained within the reactor, and its material of construction should be such that excessive corrosion and erosion are not encountered. The entire reactor may be so designed as to tube length, diameter, coil shape, etc. that the pressure will drop naturally to that of the atmosphere during passage of the reactants through it.

From the valved outlet the reaction mixture is discharged into a purification zone or flash-distillation chamber. This may consist of a vessel equipped with baffles so that the reaction mixture does not splash over. At the top of this chamber a suitably designed condenser for collecting volatile material is attached. At the lower end of the chamber may be attached a drain, through which the non-volatilized residue from the esterification product may be drawn off. This residue is preferably recycled for further esterification in a second reactor or again in the first reactor. The flash chamber may be insulated or, if necessary, may be equipped with heating devices to assure that a suitable amount of volatile material is removed at this stage. The distillate obtained from the condenser may finally be treated to recover unreacted alcohol. In the case where a polyhydric alcohol of low volatility is used, it may be found useful to add an entrainer, such as toluene, to the reaction mixture to assist in removing water.

When the reaction mixture leaves the reactor, it is at a temperature higher than the normal boiling point of the water coproduced with the ester or of the alcohol used. Thus, a considerable proportion of a volatile alcohol and water contained in the reaction mixture may be removed at this point in the purification zone, and by suitably regulating the apparatus the product esters may have their water content reduced to a low level. This is important, since one pass through the reactor with the usual proportions of a carboxylic acid and an alcohol will not completely esterify the acid. If desired, the ester product at this stage may be recovered by conventional means. However, as noted above, it is better to force the reaction more nearly to completion, that is, more fully utilize the carboxylic acid, by passing the product again through the same reactor one or more times, or through additional reactors. Before doing this, a further quantity of alcohol may be added, to assure that the equilibrium attained in the second pass is such that a larger proportion of the carboxylic acid will be esterified. The presence of water in the product from the first pass will, of course, hinder the approach to complete esterification, hence the practical importance of reducing it to as low a level as possible, within the bounds of economic operation, during the flashing stage. This may be accomplished by using the highest temperature permissible without decomposition in the reactor tube and by employing even subatmospheric pressure in the flash chamber, or as mentioned above, using an entrainer.

As hereinbefore described, the same new esterifying treatment may be repeated a second or third time, if desired. In general the number of passes through the reactor coil, the proportion of alcohol to carboxylic acid, the amount of water removed during each of the flashing operations and like factors are best so interadjusted that the free acidity of the product is reduced to about 1% or less without undue decomposition of the product. In some cases this may be accomplished in two passes, but it may require three or four, with flash-distillation of the water (and alcohol) and replenishment of the alcohol after each pass. Total residence time in the coil for a given portion of the reaction mixture is usually about 1 to about 5 minutes. After the desired degree of esterification has been attained, any remaining alcohol and water may be removed, as well as the catalyst. The latter may be neutralized or washed out of the ester before recovery operations.

The products produced by such process are particularly valuable. Many of the esters which may be prepared most conveniently by this method are useful as plasticizers. It is often desirable in such use to have a light colored or colorless product, and such materials may now be obtained with considerable ease. In the ordinary esterification of, for instance, citric acid with butanol, the reactants have heretofore been mixed with a small amount of sulfuric acid and heated for an extended period of time. An alcohol-water azeotrope is sometimes distilled out to hasten the reaction, but during its course there is considerable darkening of the product. In addition, citric acid has the definite tendency to dehydrate to aconitic acid under these conditions. This is particularly undesirable when further derivatives like acetyl tributyl citrate are to be made. Analysis of citric acid esters prepared by the new method showed that the aconitic acid (or ester) content is very low, generally less than 0.5% despite the use of temperatures as high as 200° C. The short period during which the reaction mixture must be exposed to a high temperature makes this possible. Other esters derived from acids which are commonly sensitive and difficult to esterify may now be prepared with similar success. A further advantage of the new process is the compactness of the novel preferred apparatus; to produce 10 million pounds of tributyl citrate a year, a one-inch I. D. pipe 160 feet long is required. When coiled, this naturally occupies a very small amount of space, and the auxiliary equipment necessary for running such a reactor takes up, with proper design, considerably smaller area than would be required for a similar size operation by a conventional batch method.

To summarize, this invention provides a new method for conducting esterification which is notably useful in the preparation of esters usually difficult to prepare, and in particular esters of polycarboxylic acids. Using this method, it is possible to prepare esters very economically with a relatively small, simple apparatus. The process may be operated in a continuous manner to produce large quantities of esters of high quality.

The following examples are given by way of illustration and are not to be construed as the only manner in which this process may be operated. Protection of the invention is to be limited only by the scope and specific wording of the appended claims.

*Example I*

One of the preferred reactors hereinabove described was constructed from 180 feet of Monel metal tubing, 0.125 inch in outside diameter and 0.055 inch in inside diameter. The tubing was formed into two concentric coils, one 8 inches in diameter and the other 9 inches in diameter, and the coils were immersed in an oil bath maintained at 175° C. One end of the tube was attached through a valved conduit to two stainless steel reserve tanks each of 3 gallons' capacity, so arranged that high pressure could be maintained in the reactor from one of the tanks while the other was being filled at atmospheric pressure. In this way, the pressure and flow of reaction mixture in the tube did not vary while fresh reactants were being fed to one of the reservoirs. The other end of the tube was provided with a valved outlet to a flash chamber kept under atmospheric conditions.

A mixture was separately prepared containing 12 moles of butanol and 1 mole of citric acid. To this mixture was added 1% (by weight based on the total weight of the mixture) of concentrated sulfuric acid. The free acidity due to citric acid was 42% at the start. This mixture was then added to the stainless steel feed tanks and the pressure on these was raised to 250 p. s. i. by means of nitrogen gas. The valve in the conduit leading from these tanks to the reaction coil was opened to allow the mixture to pass through, and the outlet valve on the opposite end of the coil opening to the flash chamber was also opened. The reaction mixture passed through the coil at such a rate that any given portion thereof was in the heated zone for a total of 45 seconds. As the mixture then passed into the flash chamber at atmospheric pressure, approximately 45% of the total weight was vaporized and collected from the attached condenser. Of this amount, 11 to 12% by weight was water, representing about 85% of the total amount of water formed during this first pass through the apparatus. The free acidity remaining in the esterification product was reduced from 42% to 12%.

This residual mixture was introduced into the steel feed tanks and passed through the coil a second time, again using a contact time of 45 seconds. At this pass 28% of the total weight of the material was flashed off and of this quantity 6½% was water. The free acidity of the residual product was reduced to 1½% and the water content to 2% of the total formed during the reaction. The ester product from this pass was mixed with sufficient butanol to bring the alcohol up to the proportion originally used in the first pass, and the mixture was again introduced into the steel tanks, the same conditions applied, and the third run made with a contact time of 50 seconds. At the end of this treatment practically all of the water was flashed off and the free acidity in the form of citric acid was reduced to 0.09%. The final product was freed of alcohol and acid catalyst by conventional methods and found to be tributyl citrate of high quality containing no measurable amount of aconitic acid or ester. Its color was very light and it was most suitable for use as a plasticizer.

Example II

A mixture containing 12 moles of butanol, 1 mole of citric acid and 1% of concentrated sulfuric acid (based on total weight of the mixture) was passed through the same apparatus and under the same conditions as described in Example I, but at a reaction coil temperature of 150° C. In this case, fresh butanol was added to the residual material first collected from the flash chamber, in order to restore the original ratio of butanol to citric acid (as either the free acid or the ester). The following table records the percentage of free acidity after each of the three passes through the reactor coil, as well as the percentage of the charge that was flash-distilled at the end of each pass, the composition of this distillate, the contact time in the reaction zone and the rate of flow through the apparatus.

|  | Product From the First Pass | Product From the Second Pass | Product From the Third Pass |
|---|---|---|---|
| Percent of Free Acidity | 13.85 | 4.8 | 0.85 |
| Percent of Total Charge Vaporized | 24.5 | 25.1 | 25.3 |
| Composition of Vaporized Material: | | | |
| Butanol, percent | 86.2 | 94.5 | ---- |
| Water, percent | 13.8 | 5.5 | ---- |
| Contact Time (Minutes) | 0.67 | 0.63 | 0.74 |
| Rate of Flow of Charge: | | | |
| ml./minute | 126.5 | 133.5 | 113.5 |
| grams/minute | 116 | 122 | 104 |
| Velocity, feet/second | 4.51 | 4.75 | 4.04 |

Here again the product was of very high quality, suitable as a plasticizer and for many other uses.

Example III

A mixture was prepared of three moles of citric acid, 36 moles of hexanol, and 1% by weight of sulfuric acid (based on citric acid content of the mixture). This mixture was placed in the feed chambers of the apparatus described in Example I, the reaction tube was heated to 175° C. and the mixture was passed through the system four times, under the previously described operating conditions. The following table gives the data obtained in this reaction.

|  | Product From the First Pass | Product From the Second Pass | Product From the Third Pass | Product From the Fourth Pass |
|---|---|---|---|---|
| Percent of Free Acidity | 22.6 | 7.9 | 2.96 | 1.08 |
| Percent of Charged Flash | 13.8 | 16.8 | 13.3 | 8.45 |
| Contact Time of Charge (Minutes) | 0.66 | 0.62 | 0.585 | .57 |
| Rate of Flow: | | | | |
| grams/minute | 111.0 | 118.5 | 125.8 | 129 |
| ml./minute | 127.0 | 135.5 | 143.5 | 147.5 |
| Velocity, feet/second | 4.51 | 4.81 | 5.1 | 5.25 |

MATERIAL BALANCE

|  | Product From the First Pass | Product From the Second Pass | Product From the Third Pass | Product From the Fourth Pass |
|---|---|---|---|---|
| Feed (grams) | 4,236.1 | 3,902.8 | 3,796.3 | 3,759.3 |
| Product (grams): | | | | |
| Total | 3,966.5 | 3,858.3 | 3,773.3 | 3,695.9 |
| Overhead | 547.7 | 648.5 | 490.5 | 312.6 |
| Bottoms | 3,418.8 | 3,209.8 | 3,282.8 | 3,383.3 |
| Hexanol Added (grams) | 500.0 | 618.5 | 485.5 | ---- |
| Loss | 269.6 | 44.5 | 23.0 | 63.4 |
| Percent of Water in Overhead | 5.3 | 3.25 | 1.02 | ---- |

The trihexyl citrate isolated from the product of the fourth pass by standard known methods was found to have a light color and to be highly useful, especially as a plasticizer.

Example IV

Three moles of citric acid, 36 moles of hexanol and 1% by weight of sulfuric acid (based on the citric acid) were mixed, stirred for a short time until the citric acid dissolved, and then placed in the feed tanks of the Example I equipment. Pressure in the tanks was raised to 250 p. s. i. and the mixture was passed through the reaction zone as in the previous examples. Part of the water and alcohol in the product of the first pass was flashed off and the alcohol removed in this operation was replaced. A total of four passes was made with the reaction coil at a temperature of 200° C. The following table gives the results obtained in this particular experiment.

|  | Product From the First Pass | Product From the Second Pass | Product From the Third Pass | Product From the Fourth Pass |
|---|---|---|---|---|
| Percent of Free Acidity in Product | 15.7 | 5.05 | 2.3 | 0.65 |
| Percent of Product Flashed Off | 25.7 | 22.9 | 10.8 | 19.4 |
| Contact Time (Minutes) | 0.689 | 0.695 | 0.655 | 0.678 |
| Rate of Flow: | | | | |
| grams/minute | 107.0 | 105.5 | 112.0 | 108.5 |
| ml./minute | 122.0 | 121.0 | 128.0 | 124.0 |
| Velocity, feet/second | 4.35 | 4.31 | 4.55 | 4.41 |

MATERIAL BALANCE

|  | Product From the First Pass | Product From the Second Pass | Product From the Third Pass | Product From the Fourth Pass |
|---|---|---|---|---|
| Feed (grams) | 4,244 | 3,957 | 3,890 | 3,850 |
| Product (grams): | | | | |
| Total | 4,066 | 3,929 | 3,873 | 3,847 |
| Overhead | 1,044 | 898 | 418 | 747 |
| Bottoms | 3,022 | 3,031 | 3,455 | 3,100 |
| Hexanol Added (grams) | 1,018 | 888 | 413 | ---- |
| Loss | 178 | 28 | 17 | 2.5 |
| Percent of Water in Overhead | 2.49 | 1.11 | 1.21 | ---- |

The product obtained from this preparation was somewhat darker in color than the hexanol run made at 175° C. (Example III); however, it was useful for many industrial purposes. Note that the free acidity was reduced to a lower level by the fourth pass than in Example III. The reaction with hexanol is somewhat less rapid than that with butanol.

Example V

A mixture was prepared containing 3 moles of citric acid, 36 moles of hexanol and 7.5% by weight of a mixture of lower alkanesulfonic acids (a commercially available product). This mixture was stirred until the citric acid had dissolved, placed in the feed chambers of the Example I apparatus, and passed through the reaction coil at a temperature of 175° C. and with a nitrogen pressure of 250 p. s. i. on the feed chamber. The results obtained in this preparation of trihexyl citrate are tabulated below.

|  | Product From the First Pass | Product From the Second Pass | Product From the Third Pass |
| --- | --- | --- | --- |
| Percent of Free Acidity | 5.4 | 0.75 | 0.30 |
| Percent of Product Flashed | 19.2 | 13.4 | 10.6 |
| Contact Time (Minutes) | 0.692 | 0.581 | 0.565 |
| Rate of Flow: | | | |
| grams/minute | 106 | 126 | 130 |
| ml./minute | 121 | 144 | 148.5 |
| Velocity, feet/second | 4.31 | 5.12 | 5.30 |

MATERIAL BALANCE

|  | Product From the First Pass | Product From the Second Pass | Product From the Third Pass |
| --- | --- | --- | --- |
| Feed (grams) | 4,295 | 4,084 | 3,898 |
| Product (grams): | | | |
| Total | 4,158 | 3,923 | 3,815 |
| Overhead | 798 | 524 | 405 |
| Bottoms | 3,360 | 3,398 | 3,410 |
| Hexanol Added (grams) | 738 | 514 | 405 |
| Loss (grams) | 123 | 161 | 73 |
| Percent of Water in Overhead | 7.51 | 1.91 | 0 |

A somewhat higher percentage of the alkanesulfonic acid catalyst than of sulfuric acid was used to obtain comparable results. However, the use of this higher proportion of catalyst is in no way deleterious as far as the quality of the product is concerned.

*Example VI*

A reactor comprising a ¼ inch I. D. stainless steel coil 16 feet long was constructed. This was attached at one end through suitable valves to two three-gallon capacity stainless steel tanks which could be subjected to pressure, and at the other end to an automatic pressure reducing valve discharging to the usual flash purification chamber. The coil was immersed in a heating bath at a temperature of 150° C. A mixture containing 12 moles of butanol, 1 mole of citric acid, and 1% by weight of sulfuric acid was stirred in the tanks for a short time to allow the citric acid to dissolve and then passed through the coil. Nitrogen pressure of 250 p. s. i. on the feed tanks was used to force the mixture through the apparatus. A total of four passes was made and after each pass distillation in the purification zone at atmospheric pressure removed part of the water. Alcohol simultaneously removed was replaced before the next run in each case. In the table below are summarized the contact time for any given portion of the mixture to pass through the reaction coil and the percentage of free acidity after each pass.

|  | Percent of Free Acidity (Citric Acid) | Contact Time, min. |
| --- | --- | --- |
| First Run: | | |
| Feed | 63 | |
| Product | 35 | 1.00 |
| Second run—Product | 8.1 | 0.50 |
| Third run—Product | 3 | 0.33 |
| Fourth run—Product | 1.1 | 0.20 |

It may be noted from the above table that the acidity of the esterification mixture was reduced to just over 1% during the four passes in this reaction. The product, after washing free of acid, was most suitable for use as a plasticizer, having a light color and high purity.

*Example VII*

A mixture was prepared containing 3 moles of aconitic acid, 36 moles of butanol, 5% by weight of concentrated sulfuric acid, and ¼% by weight of hydroquinone (to inhibit polymerization of the aconitic acid). The mixture was stirred for a short time until the aconitic acid was dissolved and was then placed in the feed tanks of the Example I equipment. Pressure in the tanks was increased and the mixture was passed through the reaction zone as in the previous examples. Part of the water and alcohol in the product of the first pass was flashed off and the alcohol removed in this operation was replaced. A total of three passes was made with the reaction coil at a temperature of 175° C. The following table gives the results obtained in this particular experiment.

|  | Feed | 1st Pass Product | 2nd Pass Product | 3rd Pass Product |
| --- | --- | --- | --- | --- |
| Percent Free Acidity | 61.8 | 26.1 | 12.5 | 3.7 |
| Percent Flashed | | 31.9 | 29.7 | 30.8 |
| Contact Time (min.) | | .82 | .742 | .835 |
| Rate of flow gms./min | | 90 | 99 | 88 |
| Rate of flow ml./min | | 102.5 | 113 | 101 |
| Rate of flow, linear ft./sec | | 3.65 | 4.02 | 3.57 |
| Total time of run | | 32.12 | 27.62 | 29.9 |

MATERIAL BALANCE
(Quantity of fed: 3 moles aconitic, 36 moles butanol)

|  | 1st Pass Product | 2nd Pass Product | 3rd Pass Product |
| --- | --- | --- | --- |
| Feed (gms.) | 3,185 | 2,794 | 2,710 |
| Product (gms.) | 2,891 | 2,749 | 2,624 |
| Ovhd. (gms.) | 922 | 814.5 | 810.5 |
| Bottoms (gms.) | 1,969 | 1,934.5 | 1,813.5 |
| Butanol added (gms.) | 839 | 790 | |
| Loss (gms.) | 294 | 45 | 86 |
| Percent H₂O in overhead | 9 | 3 | 2.04 |

The product from this reaction had a light color. The acidity of the product may be further reduced by another pass through the apparatus.

What is claimed is:

1. An esterification process which comprises reacting in a tubular reaction zone a carboxylic acid free of reaction-active substituents with an alkanol, at least one of the two reactants being mono-functional and the boiling point of the alcohol being below that of the ester reaction product, under superatmospheric pressure and at a temperature substantially between 100° and 300° C., flash-distilling unreacted alcohol and by-product water from the reaction product, and reacting the distillation residue in a tubular reaction zone with more of said alcohol under superatmospheric pressure and at a temperature substantially between 100° and 300° C., the total reaction time between carboxylic acid and alcohol at elevated temperature and pressure being about 1 to 5 minutes.

2. The process of claim 1 wherein the pressure is from about 100 to 250 p. s. i.

3. The process of claim 1 wherein there are between 2 and 5 mols of alcohol per mol of COOH group in the carboxylic acid.

4. The process of claim 1 wherein concentrated sulfuric acid is employed as a catalyst.

5. The process of claim 1 in which the reactants are citric acid and butanol, and the temperature and pressure are maintained substantially between 140° and 200° C. and 100 and 250 p. s. i. respectively.

6. The process of claim 1 in which the reactants are aconitic acid and butanol, and the temperature and pressure are maintained substantially between 140° and 200° C. and 100 and 250 p. s. i. respectively.

7. An esterification process which comprises reacting in a tubular reaction zone a carboxylic acid containing only carbon, hydrogen and oxygen atoms with an alkanol, at least one of the two reactants being mono-functional and the boiling point of the alcohol being below that of the ester reaction product, under superatmospheric pressure and at a temperature substantially between 100° and 300° C., flash-distilling unreacted alcohol and by-product water from the reaction product, and reacting the distillation residue in a tubular reaction zone with more of said alcohol under superatmospheric pressure and at a temperature substantially between 100° and 300° C., the total reaction time between carboxylic acid and alcohol at elevated temperature being about 1 to 5 minutes.

References Cited in the file of this patent

UNITED STATES PATENTS

| | | |
|---|---|---|
| 1,791,238 | Fuchs | Feb. 3, 1931 |
| 1,800,319 | Roha | Apr. 14, 1931 |
| 1,956,972 | Bass | May 1, 1934 |
| 2,046,150 | Cox | June 30, 1936 |
| 2,091,241 | Kvalnes et al. | Aug. 24, 1937 |
| 2,094,608 | Kritchevsky | Oct. 5, 1937 |
| 2,266,019 | Frey | Dec. 16, 1941 |
| 2,447,693 | Filachione et al. | Aug. 24, 1948 |
| 2,518,678 | Gooding | Aug. 15, 1950 |
| 2,610,206 | Highel et al. | Sept. 9, 1952 |

OTHER REFERENCES

Hackh: "Chemical Dictionary" (1944), page 151.

Groggins: Unit Processes in Organic Synthesis, 3rd Ed., McGraw-Hill (1947), page 634.